F. A. BERG.
PARACHUTE.
APPLICATION FILED FEB. 19, 1918.

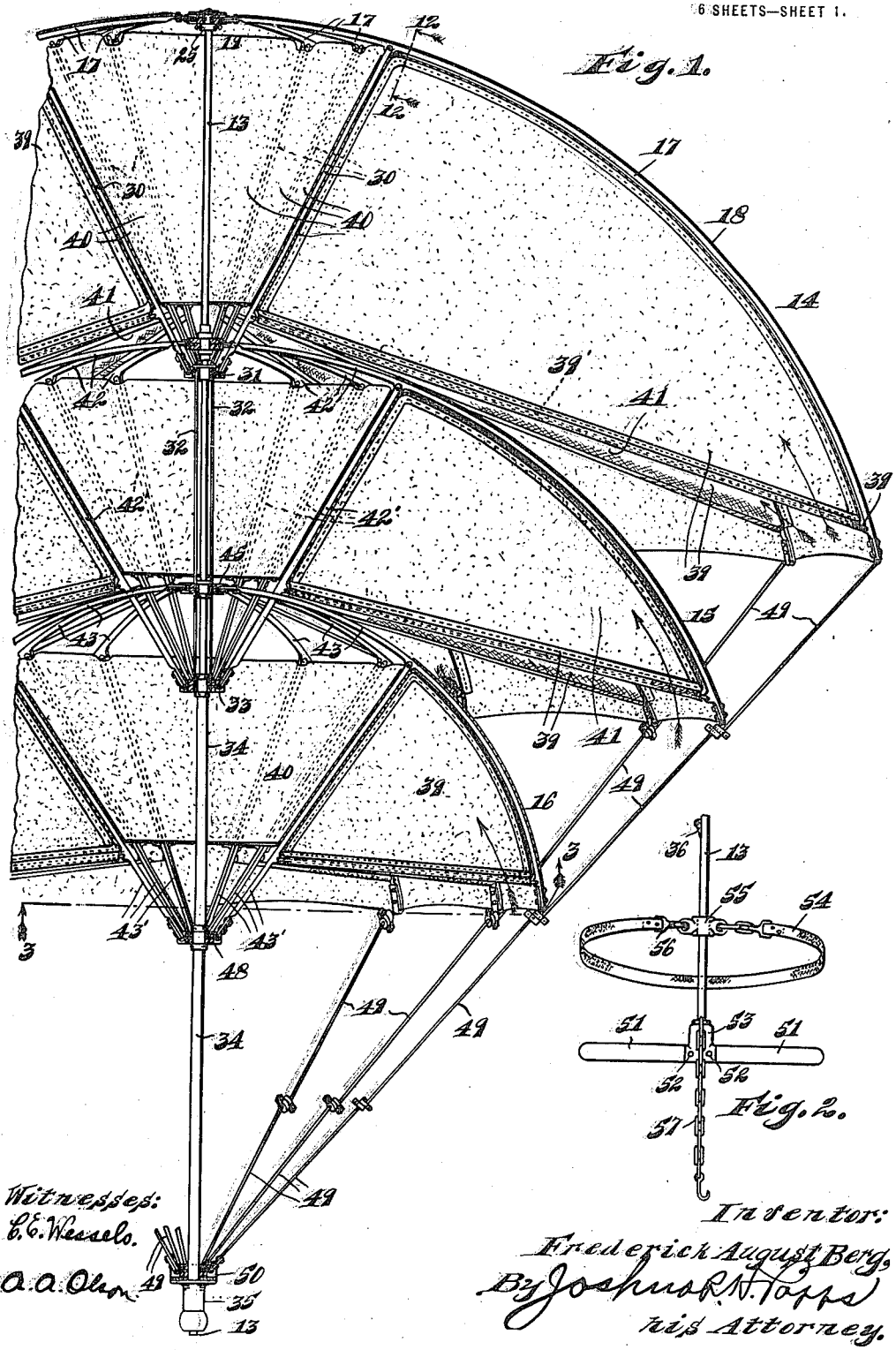

1,310,467.

Patented July 22, 1919.
6 SHEETS—SHEET 2.

Witnesses:
C. E. Wessels.
A. A. Olson.

Inventor:
Frederick August Berg,
By Joshua R. H. Potts
his Attorney.

F. A. BERG.
PARACHUTE.
APPLICATION FILED FEB. 19, 1918.

1,310,467.

Patented July 22, 1919.
6 SHEETS—SHEET 5.

Witnesses:
C. E. Wessels.
A. A. Olson.

Inventor:
Frederick August Berg,
By Joshua R. H. Potts
his Attorney.

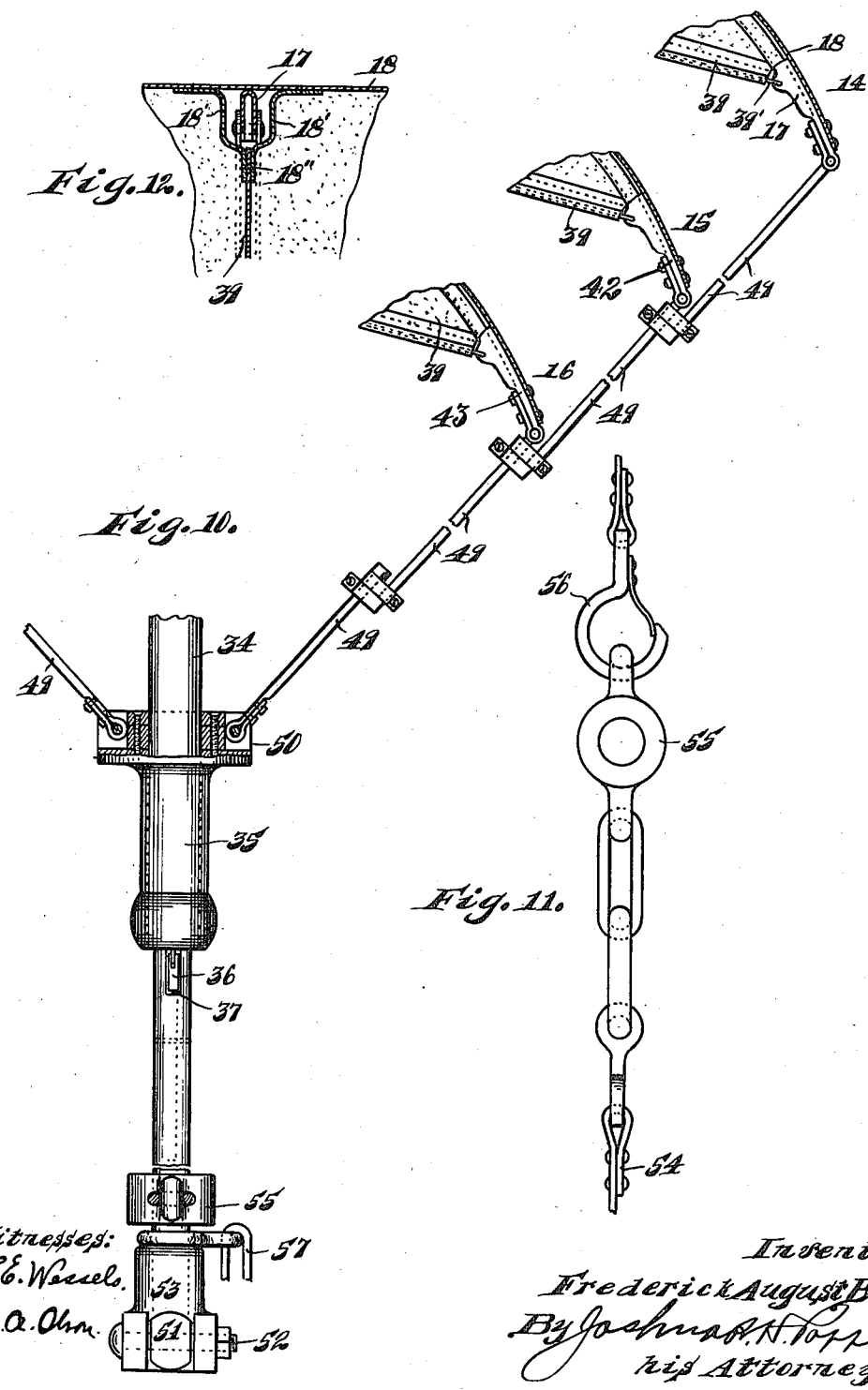

UNITED STATES PATENT OFFICE.

FREDERICK AUGUST BERG, OF CHICAGO, ILLINOIS.

PARACHUTE.

1,310,467. Specification of Letters Patent. Patented July 22, 1919.

Application filed February 19, 1918. Serial No. 218,050.

*To all whom it may concern:*

Be it known that I, FREDERICK AUGUST BERG, a citizen of the United States, and a resident of the city of Chicago, county of Cook, and State of Illinois, have invented certain new and useful Improvements in Parachutes, of which the following is a specification.

My invention relates to improvements in parachutes, designed for use especially in connection with aeroplanes or other air craft, and has for its object the production of a device of this character which will be of durable and economical construction, and which will be positive and highly efficient in use.

Other objects will appear hereinafter.

The invention consists in the combinations and arrangements of parts hereinafter described and claimed.

Figure 3:
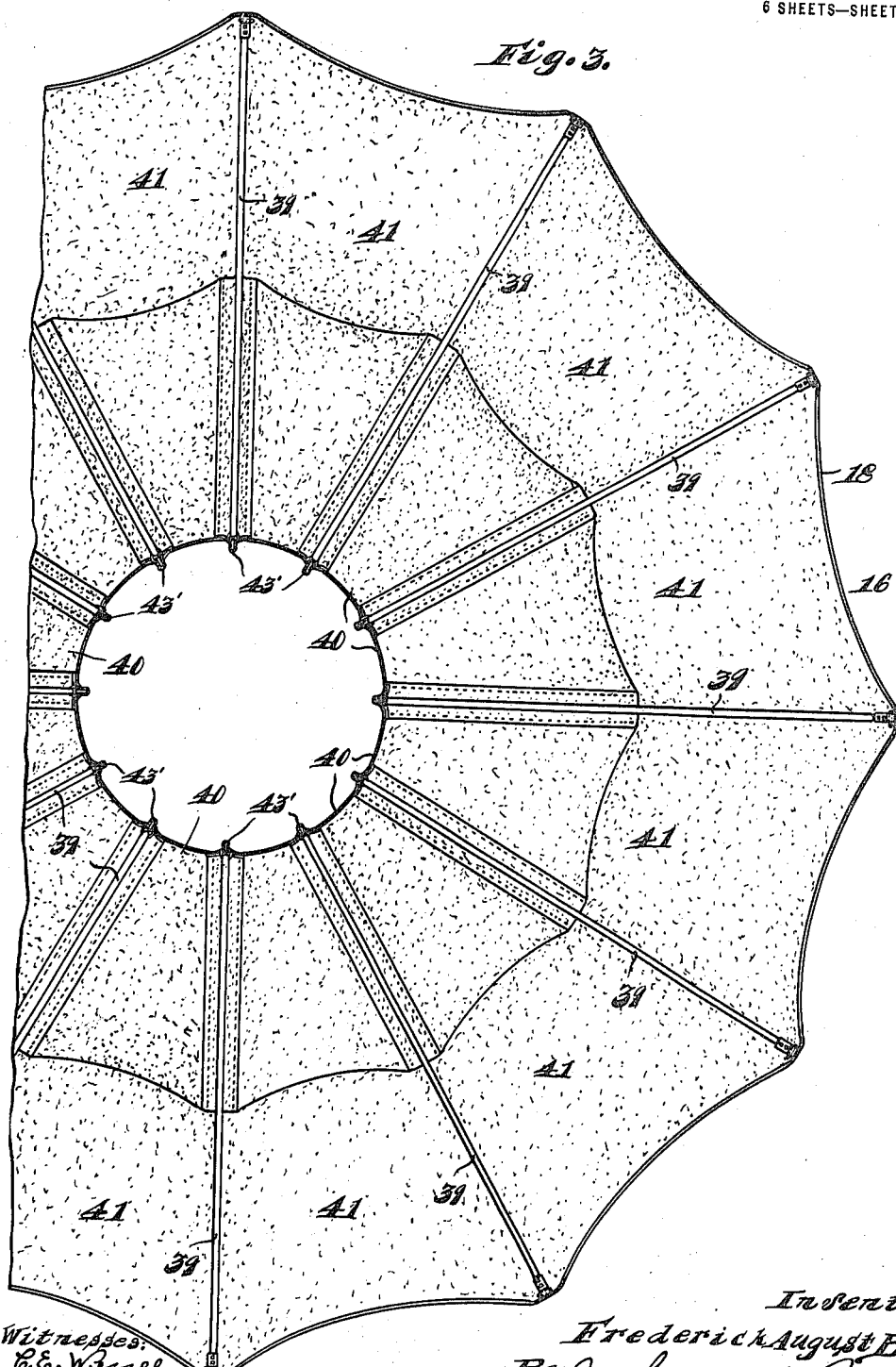
Figure 4:
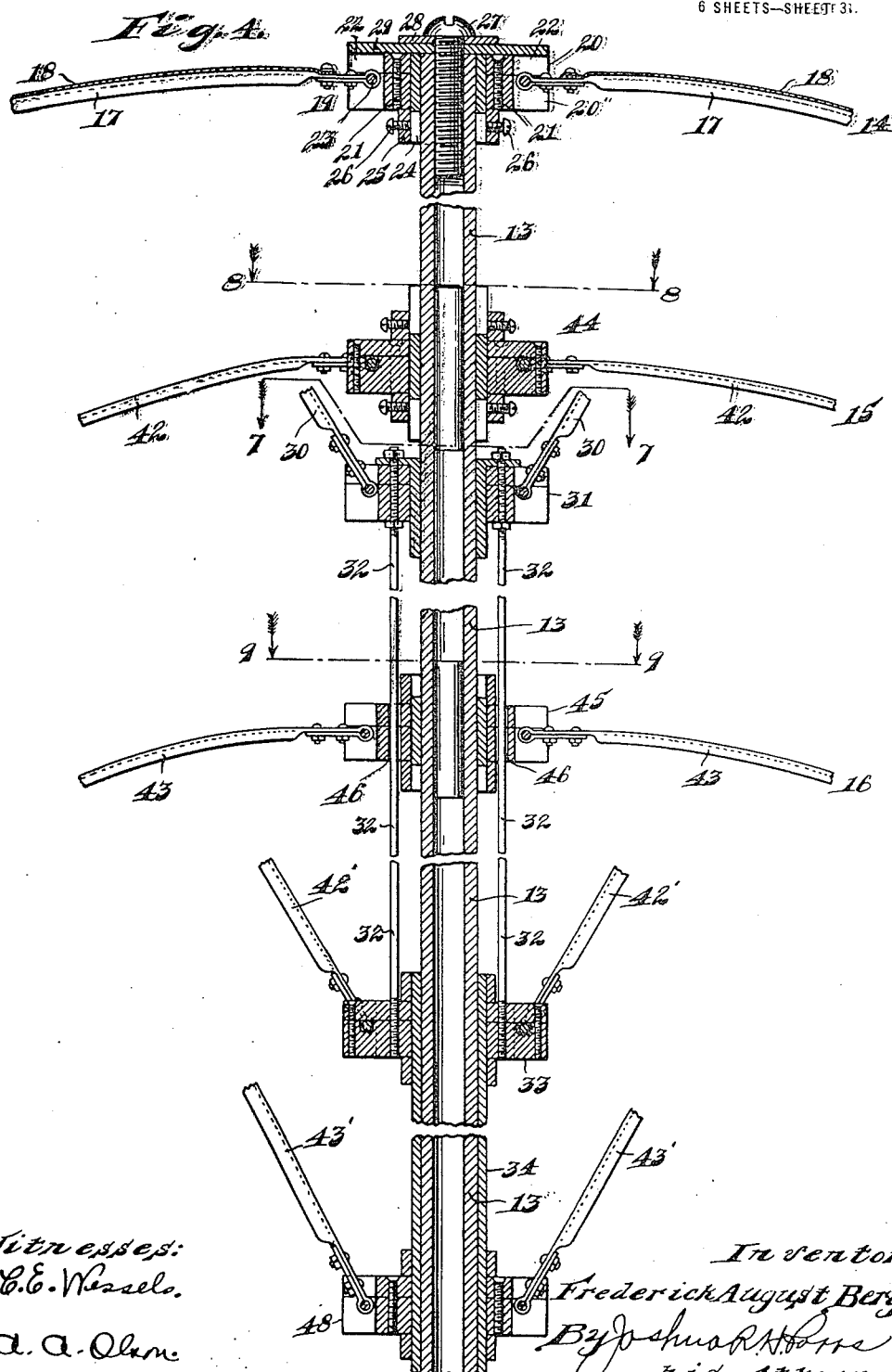
Figure 5:
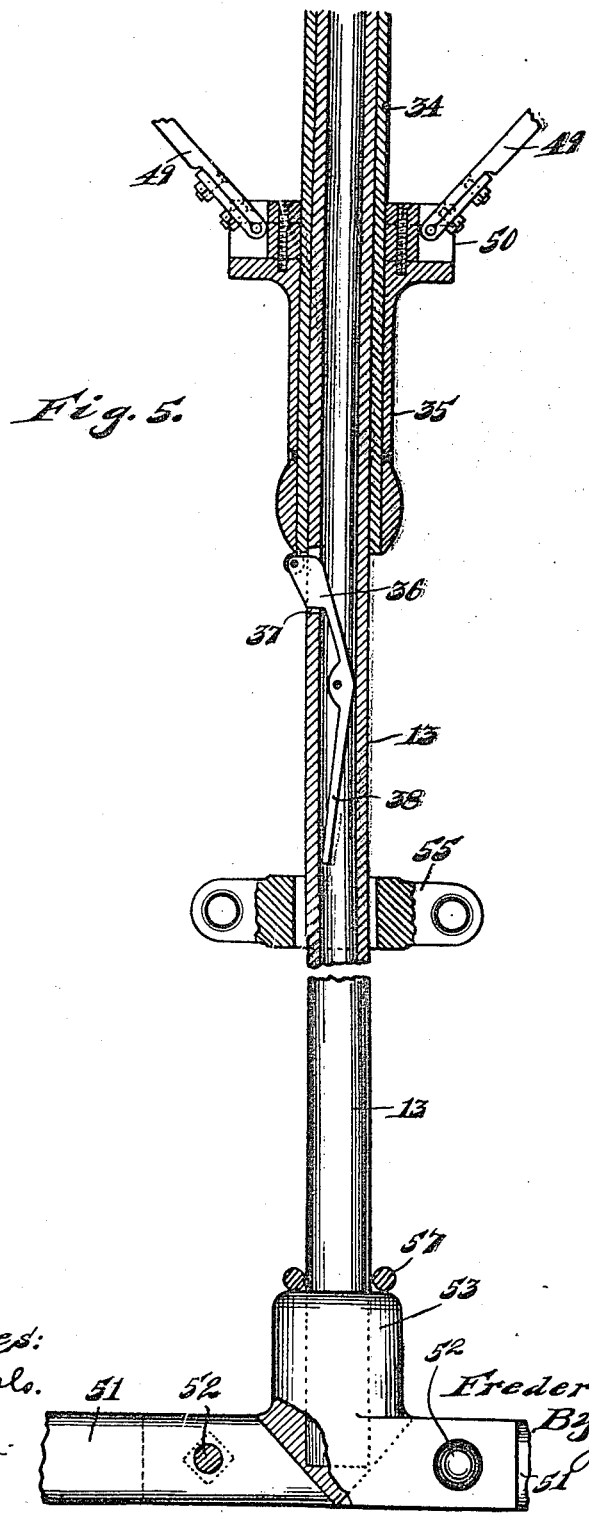

The invention will be best understood by reference to the accompanying drawings forming a part of this specification, and in which, Figure 1 is a fragmentary central vertical section through a parachute embodying the invention, the same being shown in distended or operative condition, Fig. 2, a perspective view of the lower portion of the device, Fig. 3, an enlarged section taken on substantially line 3—3 of Fig. 1, Fig. 4, an enlarged fragmental section through the various joints or connections provided along the central staff of the parachute, Fig. 5, an enlarged partially sectional fragmental view of the lower portion of the central staff of the parachute.

Figure 6:
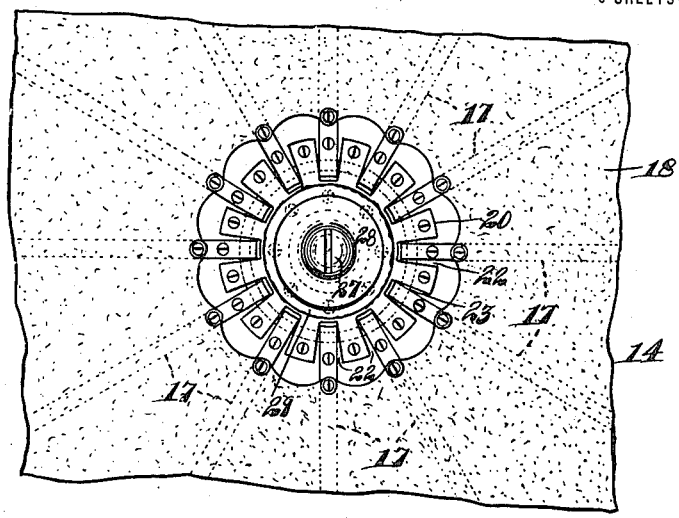
Figure 7:
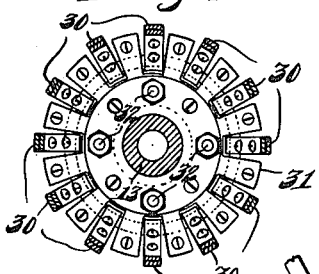
Figure 8:
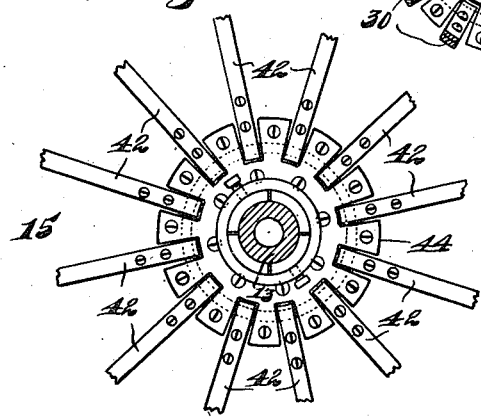
Figure 9:
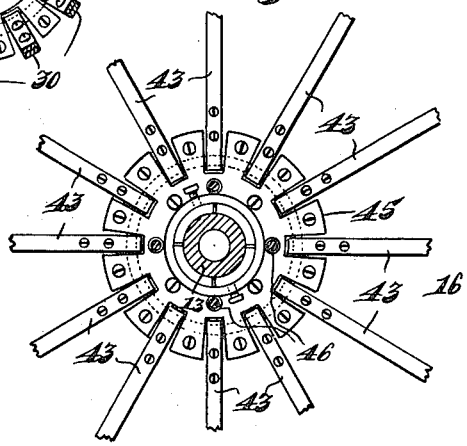

Fig. 6, a top plan view of the central portion of the uppermost sustaining element of the parachute, Figs. 7, 8, 9, detail sections taken on substantially lines 7—7, 8—8 and 9—9 respectively of Fig. 4, Fig. 10, a partially sectional fragmental view showing particularly the connection of the brace rods coöperating with the sustaining elements, with the shiftably mounted sleeve provided upon the central staff of the parachute, Fig. 11, an enlarged detail fragmental view of the belt used for fastening the operator in place, and Fig. 12, an enlarged detail section taken on line 12—12 of Fig. 1.

The preferred form of construction as illustrated in the drawings comprises a central staff 13 along which are spaced in superposed relation, a plurality of parachute or sustaining elements 14, 15 and 16. Said sustaining elements are of graduated diameter, the lowermost thereof being of smallest diameter. The element 14 comprises a series of spaced radial ribs 17 to which is secured a covering 18 of fabric or other suitable flexible material. Said covering 18 is secured to the ribs 17 by strips or flanges 18' provided upon said covering, which are adapted to embrace the corresponding rib, as seen in Fig. 12, the free edges of said strips being connected by longitudinally extending lines of stitching as at 18''. The inner ends of ribs 17 are pivotally or swingingly connected with a collar 19 provided at the upper end of staff 13. The member 19, as clearly seen in Fig. 4, is formed of two sections 20 and 20', which are secured together by screws 21. Said member 19 is formed at its periphery with a plurality of spaced radial notches 22 to accommodate the inner ends of the ribs, said ribs pivotally engaging with a ring 23 which is interposed between the collar sections 20 and 20', the latter being grooved to accommodate said ring. The collar 19 embraces a contractible sleeve 24 which is embraced at its lower slit end by a ring 25 secured in position by screws 26. Said screws serve to compress the lower end of sleeve 24 to securely lock the same to staff 13. The ring 25 holds collar 19 against downward shifting, upward shifting of said collar being prevented by a screw 27 threaded into the upper end of staff 13, there being washers 28 and 29 coöperating with said screw.

Coöperating with the ribs 17 are brace rods 30, the lower ends of which are pivotally connected with a collar 31 of practically the same construction as collar 19, which is slidably mounted upon staff 13. The collar 31 is connected by rods 32 with a collar 33 which is fixed to the upper end of a sleeve 34 longitudinally shiftable upon staff 13. The arrangement is such, as will be seen, that the sustaining element 14 will constitute a sort of umbrella top which may be folded or unfolded, that is collapsed or distended, by simply shifting sleeve 34 upon staff 13.

To facilitate the shifting movement of sleeve 34, the same is provided at its lower end with a suitable grip or handle 35. Said sleeve is automatically locked at its upper terminal of movement, or in operative position, by means of a pawl 36 pivotally mounted in the staff 13, as seen in Fig. 5, the upper end of said pawl being adapted to pass through a slot 37 in the staff in order to engage under the lower end of the sleeve, when the latter is moved to its upper terminal of movement. The lower end 38 of pawl 36 constitutes a sort of leaf spring which serves to yieldingly hold the upper end thereof in operative or protruding position. When it is desired to lower said sleeve, it is only necessary to depress the upper end of said pawl.

Provided at the underside of the covering 18 of sustaining element 14 is a plurality of spaced radially disposed partitions 39 which are connected at their upper edges with the ribs 17 and at their inner edges with the brace rods 30. At the lower edge of each partition is provided a wire or other flexible reinforcement 39' which extends from the corresponding rib 17, adjacent the outer end thereof, to the corresponding brace rod 30, adjacent the lower end thereof, as clearly seen in Fig. 1. Adjacent brace rods 30 are connected by partitions 40, the arrangement being such that a plurality of radially disposed, downwardly opening independent compartments 41 will be formed at the underside of the covering 18, each of said compartments being defined by side walls 39, end wall 40 and a top wall constituted by the covering 18. An inverted conically formed, downwardly opening compartment will be formed at the center of said element surrounding the staff 13, as clearly seen in Fig. 1. Each of the sustaining elements 15 and 16 is practically identical in form with sustaining element 14 just described, the ribs 42 and 43 of elements 15 and 16 respectively, being pivotally connected with collars 44 and 45 respectively, which are fixed to staff 13. The collars 44 and 45 are of practically the same construction as collar 19, the collar 45 being, however, slotted at 46 to permit of the passage of rods 32, as clearly seen in Fig. 4. The brace rods 42' and 43' which coöperate with the ribs 42 and 43 respectively, are connected in the same manner as brace rods 30 above described, with collars 33 and 48 respectively fixed to sleeve 34. The arrangement is such, as will be seen, that in the shifting of sleeve 34, all of said sustaining elements will be simultaneously folded or unfolded, that is collapsed or distended.

The undersides of elements 15 and 16 are formed with downwardly opening compartments the same as element 14, this construction being clearly illustrated in Fig. 3, where the partitions and compartments of the element 16 are numbered to correspond with the same parts in element 14 above set forth. In the elements 15 and 16, however, the covering in each is cut away at the center, so as to form an opening or free passage, as clearly seen in Fig. 1.

The outer ends of the ribs of elements 14, 15 and 16 are connected together by collapsible stay rods, each of which is formed of a plurality of sections 49, the adjacent ends of said sections overlapping and loosely embracing each other, as clearly seen in Figs. 1 and 10. Said stay rods connect the ribs of said elements with an anchoring collar 50 fixed to sleeve 34, the arrangement being such that said stay rods will serve to limit upward movement of the outer ends of the ribs, in the use of the parachute, the same being adapted, however, upon collapse or folding of the parachute, to slide or collapse together as will be readily understood.

At the lower end of staff 13 is provided an operator's seat formed of two arms 51 which are pivotally connected at 52 with a T-shaped connecting member 53, fixed to said staff, as seen in Fig. 5. To securely lock the operator to the parachute, a belt 54 is provided, as seen in Figs. 2 and 11, one end of said belt being permanently fastened to a sleeve 55 slidably mounted upon staff 13, the opposite end of said belt having a snaphook 56 engageable with a loop on sleeve 55. Depending from the lower end of the staff 13 is also a chain 57 which may be employed to anchor the paracute to the ground after a descent has been made.

In operation, the parachute in folded or collapsed condition, will be carried at any convenient place on the aeroplane or other air craft in connection with which the same is employed. The preferred carriage is to have the parachute depend or hang from the aeroplane, with the belt 54 strapped around the aviator. In case of disabling of the flying machine, it is only necessary for the aviator to drop therefrom. In so dropping, the parachute will be carried to upright position and the resistance of the air will effect automatically the opening or unfolding of the sustaining elements. This opening may also be aided by the operator or occupant through manual shifting of the sleeve 34. The resistance offered by said sustaining elements insures an easy and gradual descent, and the arrangement is such that the opening or unfolding of the parachute is practically instantaneous; inasmuch as the ribs of the sustaining elements always hold the same partly open for engagement with the air. The provision of independent pockets renders the device operative, although one or more of the former might be destroyed through tearing of the fabric which may be accidental or occasioned by gun-fire in war time. The circulation of the air through said pockets or compartments, and the gradual escape of the air upwardly through the centers of the two lowermost sustaining elements, has a steadying or stabilizing effect, which insures an even, easy descent. The central openings in the two lower sustaining elements are of considerable diameter, as seen, the uppermost sustaining element being, however, provided with a very restricted annular opening, as seen in Fig. 6, to permit of a very gradual restricted escape of the air therethrough.

The employment of a plurality of sustaining elements of graduated diameters, serves to lessen the pressure on the uppermost element, which otherwise is tremendous during use of the parachute.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A parachute comprising a central staff; a plurality of series of pivotally mounted ribs spaced along said staff; a covering connected with each of said series of ribs; brace rods coöperating with said ribs; means coöperating with said brace rods for simultaneously rocking said series of ribs; and collapsible stay members coöperating with the outer ends of said ribs, each of said stay members comprising a plurality of sections slidably engaging each other, substantially as described.

2. A parachute comprising a central staff; a series of radial ribs pivotally connected with said staff; a covering connected with said ribs, the pivotal connection of said ribs with said staff comprising an annular connecting member formed of two superimposed sections, said member having spaced notches in its periphery; and a ring interposed between said sections and traversing said notches for engagement by said ribs, substantially as described.

3. A parachute comprising a central staff; a series of radial ribs pivotally connected with said staff; a covering connected with said ribs, the pivotal connection of said ribs with said staff comprising an annular connecting member formed of two superimposed sections, said member having spaced notches in its periphery; and a ring interposed between said sections and traversing said notches for engagement by said ribs, said sections being annularly grooved at their adjacent sides for the reception of said ring, substantially as described.

4. A parachute comprising a central staff; a plurality of collapsible sustaining elements arranged in superposed relation on said staff and collapsible stay members each connected with said sustaining elements, substantially as described.

5. A parachute comprising a plurality of collapsible sustaining elements arranged in spaced super-posed relation; and collapsible stay members coöperating with and connecting the peripheries of said sustaining elements, each of said stay members comprising a plurality of sections slidably engaging each other, substantially as described.

6. A parachute comprising a central staff; a plurality of series of ribs spaced along said staff; a covering connected with each of said series of ribs; and collapsible stay members each connected with said staff and with the outer ends of corresponding ribs in each series, substantially as described.

In testimony whereof I have signed my name to this specification in the presence of two subscribing witnesses.

FREDERICK AUGUST BERG.

Witnesses:
JOSHUA R. H. POTTS,
HELEN F. LILLIS.